United States Patent [19]

Berney

[11] 4,007,408
[45] Feb. 8, 1977

[54] APPARATUS FOR SYNCHRONIZATION OF A MOTOR

[76] Inventor: Jean-Claude Berney, 3, Chemin des Croix-Rouges, Lausanne, Switzerland

[22] Filed: Feb. 4, 1975

[21] Appl. No.: 546,889

[30] Foreign Application Priority Data

Feb. 13, 1974 Switzerland ............... 1990/74

[52] U.S. Cl. ............................ 318/314; 318/318
[51] Int. Cl.² ....................................... H02P 7/36
[58] Field of Search ..................... 318/318, 314

[56] References Cited

UNITED STATES PATENTS

| | | | |
|---|---|---|---|
| 3,096,483 | 7/1963 | Ransom | 318/318 UX |
| 3,646,417 | 2/1972 | Cassie et al. | 318/318 |
| 3,681,670 | 8/1972 | Kadokura et al. | 318/318 |
| 3,694,716 | 9/1972 | Eland | 318/318 X |

Primary Examiner—B. Dobeck
Attorney, Agent, or Firm—Haseltine, Lake & Waters

[57] ABSTRACT

Synchronization apparatus for a motor comprising a maintenance circuit furnishing to the motor the necessary energy for its rotation and delivering a frequency $fm$ proportional to its speed, and utilizing a precise frequency $fp$ furnished, for example, by a quartz oscillator connected to a frequency divider. Connected to a bistable phase comparator are the output frequency $f1 = fp/x$ of a divider by $x$, and the output of frequency $f2$ of a divider by $x + \alpha$ to the input of which divider there is added $\alpha y$ impulses to each cycle of the frequency $fm$. The output of the phase comparator acts on the maintenance circuit such as to interrupt or re-establish the distribution of the energy to the motor according to whether this output is in one state or the other such that $f2$ is equal and in phase with $f1$ and $fm$ is sychronized to a mean value equal to $fp/xy$ for which $\alpha$, $x$, and $y$ are whole numbers.

10 Claims, 1 Drawing Figure

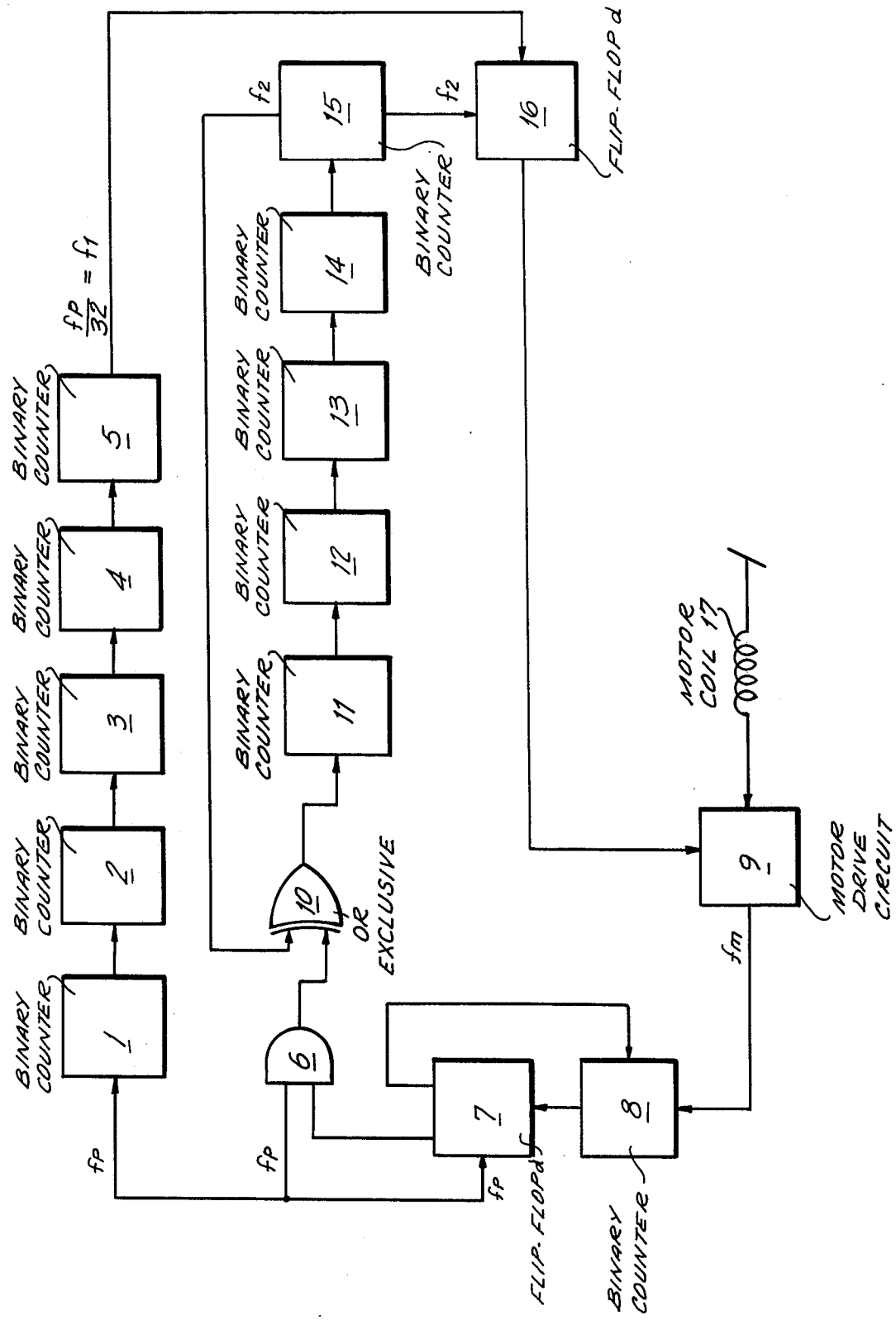

APPARATUS FOR SYNCHRONIZATION OF A MOTOR

FIELD OF THE INVENTION

The invention relates to apparatus for the synchronization of the speed of a motor to a given precise frequency.

BACKGROUND OF THE INVENTION

A conventional motor includes a rotor carrying magnets which induce a voltage at the terminals of one or a plurality of coils, and these motors have characteristics which are very interesting for applications to timepieces. In fact, the speed of rotation of the motor can be synchronized with a given reference frequency, for example, from a quartz oscillator connected to a frequency divider, by means of a regulating circuit which proportions the electrical energy furnished to the motor.

This poses few problems in applications where the energy is not limited. In contrast, in quartz watches where the utilization of a complementary MOS logic is practically indispensable, the utilization of analog circuits or of high pass or low pass filters is practically excluded, and the principal difficulty resides in the fact that the speed of rotation of the motor is very variable and thereby one can not utilize a simple phase comparator because this would risk synchronizing on a submultiple of the desired speed or of desynchronizing at the least perturbation due to accelerations of the support.

SUMMARY OF THE INVENTION

An object of the invention is to provide synchronization apparatus which has the advantage of only utilizing logic circuits and of controlling the rotation of the motor without error even if there is instantaneously a difference of a plurality of cycles between the speed of rotation of the motor and the desired speed.

This arrangement which comprises a maintenance circuit furnishing to the motor the necessary energy to drive the same and delivering a frequency fm proportional to its speed and utilizes a precise frequency fp furnished, for example, by a quartz oscillator connected to a frequency divider, is characterized by the fact that on the one hand the output frequency $f1 = (fp/x)$ of a divider by $x$ and on the other hand the output frequency $f2$ of a divider by $x + \alpha$ where $\alpha$ can be negative at the input of which there is added $\alpha y$ impulses to each cycle of the frequency fm, are applied to an on — off phase comparator whose output acts on the maintenance circuit such as to cut or re-establish the distribution of the energy to the motor according to whether this output is in one state or another which provides maintaining $f2$ equal and in phase with $f1 = (fp/x)$ and of synchronizing fm to a mean value equal to $(fp/\alpha xy)$ for which $\alpha$, $x$, and $y$ are whole numbers.

BRIEF DESCRIPTION OF THE DRAWING

The sole FIGURE of the drawing shows, by way of example, a schematic diagram of the apparatus according to the invention.

DETAILED DESCRIPTION OF THE DRAWING

A precise frequency fp is applied to a frequency divider formed by dividers i.e. binary counters 1, 2, 3, 4, and 5, the latter delivering a signal of a frequency of $f1 = (fp/32)$.

The frequency fp is also applied to the watch input of a flip-flop d designated by 7, whose inverse output is connected to the second input of a gate 6 and whose direct output is connected to the zero reset of a counter by two or binary counter 8. Counter 8 receives impulses of frequency fm from the drive circuit of motor 9 and the output of counter 8 is connected to the input d of flip-flop 7.

The above configuration, itself well-known, provides subtraction of one impulse at the output of gate 6 each time that an impulse of frequency fm appears at the input of binary counter 8. These return to add $\alpha y$ impulses to each cycle of fm, $\alpha$ being equal to $-1$ and $y$ to 1. This, of course, is the matter of a particular case, $\alpha$ and $y$ being known, the rate of division of the second divider should be $x - 1 = 31$ and fm should be synchronized at $(fp/x)$, which is going to be demonstrated.

The output of gate 6 is connected to the input of an OR EXCLUSIVE gate 10 whose output is connected to a divider by 32 formed by five binary counters 11, 12, 13, 14, and 15. The output of the latter, of frequency $f2$, is connected to the second input of the OR EXCLUSIVE gate 10 which produces a phase shift of 180° of the signal at the input of binary counter 11 each time that the output of binary counter 15 changes state, or two times per cycle. The total phase shift for each cycle of $f2$ is 360° which is equivalent to adding one impulse at the input of binary counter 11. The rate of division X1 thus obtained is:

$$X1 \, n + n = 32n$$

$$X1 = 32 - 1 = 31$$

$n =$ number of cycles of $f2$.

This is precisely the sought value.

The output of the frequency $f1$ of binary counter 5 is applied to the watch input of a flip-flop d designated by 16 which receives at its input d the output of the frequency $f2$ of the binary counter 15. The flip-flop 16 functions as an on - off phase comparator between the frequencies $f1$ and $f2$, since the state of the output of this flip-flop depends on the phase between the watch pulse and the signal applied to the input d. This output acts on the drive circuit 9 in such manner to cut the transmission of energy to the motor coil 17 when the frequency $f2$ is behind $f1$ or to re-establish it when $f2$ is ahead of $f1$. In the first case, the motor no longer receives energy, its speed of rotation diminishes from fm and there will be substracted less pulses at the output of gate 6. The frequency $f2$ is going to increase and it is going to overtake its delay with respect to $f1$ up to the moment when it begins to advance. The phase comparator changes over in this second case. The motor receives more energy, its speed of rotation increases, fm also, and a much greater number of impulses are substracted at the output of gate 6. The frequency $f2$ is going to diminish and lose its advance and thus follow in time. It is thus seen that there is obtained a correlation which maintains $f1$ and $f2$ is equal and in phase. If these two outputs are in phase, the following equation is applicable:

$$nx - nx \, fm/fp = n \text{ wherein } fm = fp/x$$

This shows that the correlation of the frequency $f2$ to the value $f1$ automatically produces the synchronization of fm to a mean value of $fp/x$.

Of course, $y$ and $\alpha$ can be different from 1. Then the equation becomes $$\frac{nx - \frac{n\alpha y \times fm}{fp}}{x - \alpha} = n$$

wherein $fm = fp/yx$

The system is particularly interesting because of the fact that fm cannot in any case synchronize itself as a sub-multiple of this value. It is obvious that the arrangement can be realized with other circuit combinations and in choosing other values for $x$, $y$, and $\alpha$ as long as these remain whole numbers.

What is claimed is:

1. Apparatus for synchronizing the speed of a motor to a given precise frequency fp, the motor having a drive circuit which furnishes the motor with the necessary energy for its rotation, the motor delivering a frequency fm proportional to its speed, said apparatus comprising a divider by $x$ having an input receiving a signal of frequency fp and an output at which is produced a signal with a frequency $fp/x$, a second divider of $x + \alpha$ having an input receiving signals of frequency $fm + \alpha y$, said second divider having an output at which is produced a signal with a frequency $f2$, a phase comparator having two states, one of coincidence, the other of non-coincidence, said phase comparator having a first input connected to the output of the first divider and a second input connected to the output of the second divider, said phase comparator having an output connected to the motor drive circuit to interrupt or re-establish the distribution of energy to the motor according to whether the output of the phase comparator is in one state or the other to maintain $f2$ equal and in phase with $f1$ and synchronizing $fm$ to a mean value of $fp/xy$, wherein $\alpha$, $x$, and $y$ are whole numbers.

2. Apparatus as claimed in claim 1 wherein said second divider comprises an OR exclusive gate having one input receiving the output signal from said second divider.

3. Apparatus as claimed in claim 2 comprising an AND gate having one input receiving the signal of frequency fp and an output connected to a second input of the OR exclusive gate.

4. Apparatus as claimed in claim 3 comprising a binary counter having an input connected to the motor drive circuit for receiving the signal of frequency fm therefrom, and a flip-flop having one input connected to the output of the binary counter, a second input receiving the signal of frequency fp, and an output connected to a second input of the AND gate.

5. Apparatus as claimed in claim 4 wherein said binary counter has a second input connected to the output of said flip-flop.

6. Apparatus for synchronizing the speed of a motor to a given precise frequency $fp$, the motor having a drive circuit which furnishes the motor with the necessary energy for its rotation, the motor delivering a frequency $fm$ proportional to its speed, said apparatus comprising a first divider for dividing by a whole number $x$ and having an input receiving a signal of frequency $fp$ and an output at which is produced a signal with a frequency $fp/x$, pulse addition means producing a pulse of the frequency $fm + \alpha y$ where $\alpha$ and $y$ are whole numbers, a second divider for dividing by $x + \alpha$ and having as an input the output of said pulse addition means, said second divider having an output at which is produced a signal with a frequency $f2$, a phase comparator having two states, one of coincidence, the other of non-coincidence, said phase comparator having a first input connected to the output of the first divider and a second input connected to the output of the second divider, said phase comparator having an output connected to the motor drive circuit to interrupt or re-establish the distribution of energy to the motor according to whether the output of the phase comparator is in one state or the other to maintain $f2$ equal and in phase with $f1$ and synchronizing $fm$ to a mean value of $fp$.

7. Apparatus as claimed in claim 6 wherein said second divider comprises an OR exclusive gate having one input receiving the output signal from said second divider.

8. Apparatus as claimed in claim 7 comprising an AND gate having one input receiving the signal of frequency $fp$ and an output connected to a second input of the OR exclusive gate.

9. Apparatus as claimed in claim 8 comprising a binary counter having an input connected to the motor drive circuit for receiving the signal of frequency fm therefrom, and a flip-flop having one input connected to the output of the binary counter, a second input receiving the signal of frequency $fp$, and an output connected to a second input of the AND gate.

10. Apparatus as claimed in claim 9 wherein said binary counter has a second input connected to the output of said flip-flop.

* * * * *